(12) United States Patent
Sato et al.

(10) Patent No.: US 7,213,845 B2
(45) Date of Patent: May 8, 2007

(54) TUBE JOINT

(75) Inventors: Motohiro Sato, Toride (JP); Yoshimoto Taneya, Koshigaya (JP); Noriyoshi Maruyama, Toride (JP)

(73) Assignee: SMC Kabushiki Kaisha, Tokyo (JP)

( * ) Notice: Subject to any disclaimer, the term of this patent is extended or adjusted under 35 U.S.C. 154(b) by 193 days.

(21) Appl. No.: 10/924,971

(22) Filed: Aug. 25, 2004

(65) Prior Publication Data

US 2005/0046178 A1 Mar. 3, 2005

(30) Foreign Application Priority Data

Aug. 27, 2003 (JP) ............................. 2003-303635

(51) Int. Cl.
*F16L 55/00* (2006.01)
(52) U.S. Cl. ..................... 285/86; 285/316; 285/315; 285/85
(58) Field of Classification Search ................. 285/93, 285/315, 316, 81, 84, 85, 86
See application file for complete search history.

(56) References Cited

U.S. PATENT DOCUMENTS

| | | | | |
|---|---|---|---|---|
| 2,736,578 A * | 2/1956 | Rafferty | ........................ | 285/91 |
| 2,935,338 A * | 5/1960 | Mills, Jr. | .................. | 251/149.5 |
| 3,359,015 A * | 12/1967 | Zahuranec | .................... | 285/89 |
| 3,422,390 A * | 1/1969 | Tucker | ........................ | 439/348 |
| 3,477,688 A * | 11/1969 | Cruse | ....................... | 251/149.9 |
| 3,817,560 A * | 6/1974 | Guertin | ........................ | 285/90 |
| 3,873,062 A * | 3/1975 | Johnson et al. | .......... | 251/149.6 |
| 4,114,853 A * | 9/1978 | Medvick | .................... | 251/149.6 |
| 4,139,222 A * | 2/1979 | Loland | ........................ | 285/27 |
| 4,148,459 A * | 4/1979 | Martinez | .................. | 251/149.6 |
| 4,664,420 A * | 5/1987 | Demeri | ........................ | 285/86 |
| 4,682,795 A * | 7/1987 | Rabushka et al. | .............. | 285/1 |
| 4,776,614 A * | 10/1988 | Marrison et al. | .............. | 285/87 |
| 5,066,049 A * | 11/1991 | Staples | ........................ | 285/80 |
| 5,092,364 A * | 3/1992 | Mullins | .................. | 137/614.05 |
| 5,161,568 A * | 11/1992 | Turvey | ........................ | 137/383 |
| 5,230,538 A * | 7/1993 | Kobayashi | .................. | 285/316 |
| 5,255,714 A * | 10/1993 | Mullins | .................. | 137/614.04 |
| 5,406,980 A | 4/1995 | Allread et al. | | |
| 5,451,031 A * | 9/1995 | Purvis et al. | .............. | 251/89.5 |
| 5,462,316 A * | 10/1995 | Street et al. | .................. | 285/81 |
| 5,494,073 A | 2/1996 | Saito | | |
| 5,709,243 A | 1/1998 | Wells et al. | | |
| 5,884,943 A * | 3/1999 | Katzer et al. | .................. | 285/38 |
| 5,896,889 A * | 4/1999 | Menard | .................. | 137/614.04 |
| 6,079,752 A * | 6/2000 | Meisinger | .................... | 285/363 |
| 6,283,443 B1 | 9/2001 | Taneya | | |
| 6,523,863 B2 * | 2/2003 | Ishiwata | ...................... | 285/316 |
| 6,561,551 B2 * | 5/2003 | Kawakami et al. | ......... | 285/316 |
| 6,681,803 B2 | 1/2004 | Taneya et al. | | |
| 2003/0080553 A1* | 5/2003 | Wieder | ........................ | 285/81 |

FOREIGN PATENT DOCUMENTS

DE 28 26 344 12/1979

(Continued)

*Primary Examiner*—Aaron Dunwoody
(74) *Attorney, Agent, or Firm*—Paul A. Guss (57) ABSTRACT

A tube joint comprises a retaining mechanism which retains the locked state by preventing a sleeve from any rotation in the circumferential direction which would be otherwise caused by any unexpected external force. The retaining mechanism includes a ratchet which is provided to surround the outer circumferential surface of a socket body and which is rotatable synchronously with the sleeve, and a coil spring which is interposed between the sleeve and the ratchet and which makes an urging action to cause mutual separation under an action of the spring force.

9 Claims, 12 Drawing Sheets

FOREIGN PATENT DOCUMENTS

| | | |
|---|---|---|
| JP | 51-69119 | 6/1976 |
| JP | 55-14317 | 1/1980 |
| JP | 59-23184 | 2/1984 |
| JP | 09-14554 | 1/1997 |
| JP | 2604307 | 5/2000 |

* cited by examiner

LOCKED STATE

FIG. 13

UNLOCKED STATE

TUBE JOINT

BACKGROUND OF THE INVENTION

1. Field of the Invention

The present invention relates to a tube joint for a fluid. In particular, the present invention relates to a tube joint which is provided with an attachment/detachment mechanism for a socket and a plug.

2. Description of the Related Art

When a fluid supply source and a fluid consumption source are piped to one another by using, for example, a hose or a hard pipe or tube, a variety of tube joints, each of which is composed of a socket and a plug for facilitating connection and separation, have been hitherto used.

In relation to the tube joint of this type, for example, the following structure is disclosed in Japanese Laid-Open Utility Model Publication No. 51-69119. A cutout is provided on the outer circumference of a slide sleeve for fitting/detaching a one-touch coupling. A pin, which is engageable with the cutout, is secured to the outer surface of the socket. The slide sleeve is released from the locked state only when the position of the pin is coincident with the position of the cutout in the axial direction. The socket and the plug can be detached from each other by slidably moving the slide sleeve in the axial direction.

In other words, the tube joint, which is disclosed in Japanese Laid-Open Utility Model Publication No. 51-69119, is constructed as follows. That is, the locked state is established, in which the slide sleeve cannot be slidably moved in the axial direction when the position of the pin is not coincident with the position of the cutout in the axial direction by rotating the slide sleeve in the circumferential direction in the state in which the socket and the plug are connected to one another.

However, in the case of the tube joint disclosed in Japanese Laid-Open Utility Model Publication No. 51-69119 described above, the positional relationship is unstable between the slide sleeve and the pin in the locked state. It is feared that the slide sleeve may be rotated in the circumferential direction by applying any unexpected external force to the slide sleeve to provide the unlocked position at which the position of the pin is coincident with the position of the cutout, and the socket and the plug may be separated from each other.

SUMMARY OF THE INVENTION

A general object of the present invention is to provide a tube joint which makes it possible to retain the locked state of a sleeve reliably and stably.

Another object of the present invention is to provide a tube joint which makes it possible to avoid any erroneous connection between a socket and a plug even in the case of the construction of a fluid circuit obtained by combining a plurality of tube joints having an identical structure.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An explanation will be made below with reference to FIGS. 1 to 13 about embodiments of the tube joint according to the present invention. In the following explanation, in order to specify the direction, each of the socket and the plug is described in such a manner that the frontward direction and the front end reside in the side on which they are connected to one another, and the rearward direction and the rear end reside in the opposite side in the direction in which each the socket and the plug is connected to another tube passage (or a hose).

Figure 1:
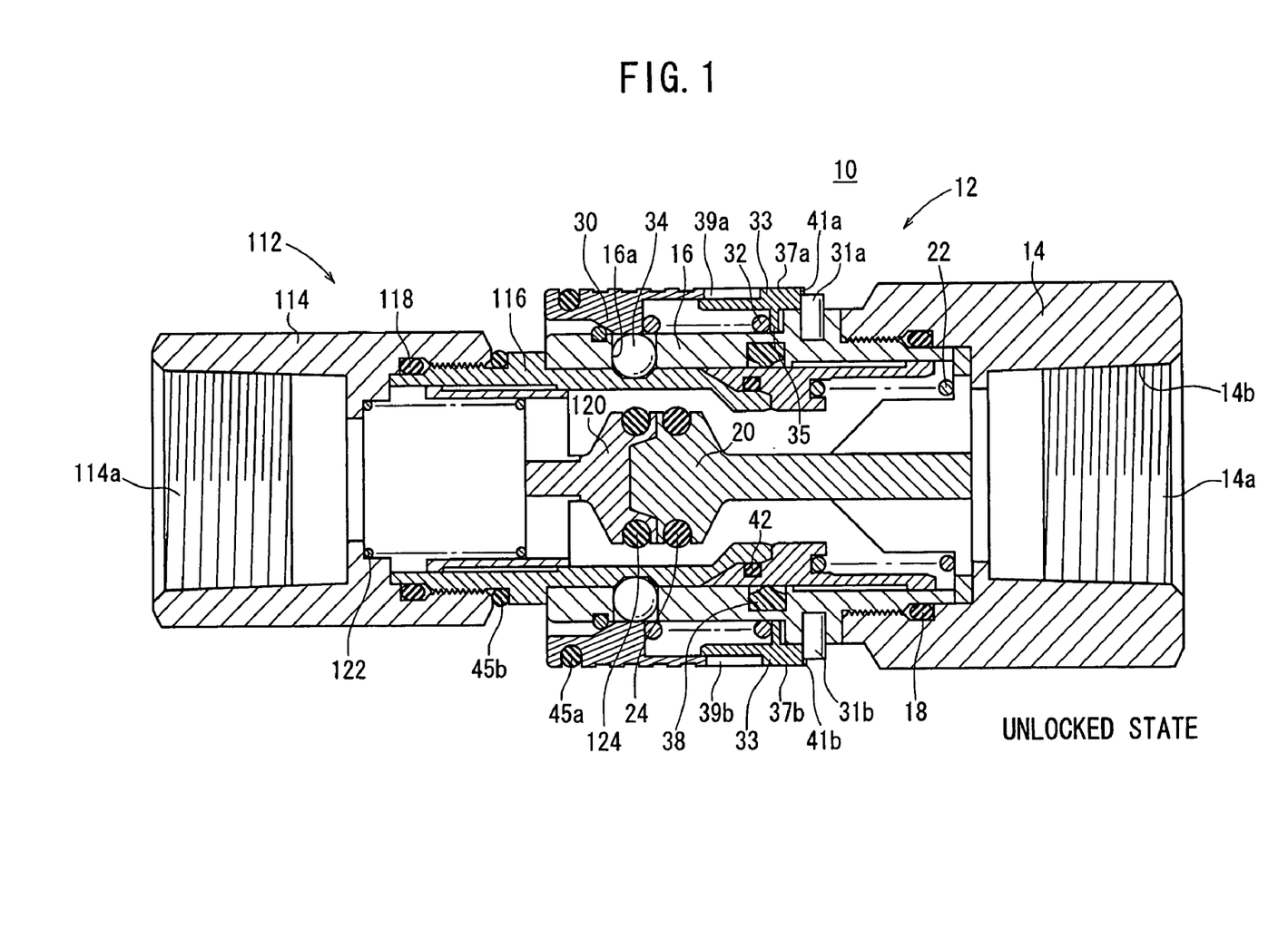
FIG. 1 shows a longitudinal sectional view taken in the axial direction illustrating the unlocked state of a tube joint according to a first embodiment.

As shown in FIG. 1, a tube joint 10 according to a first embodiment comprises a socket 12 and a plug 112.

Figure 2:
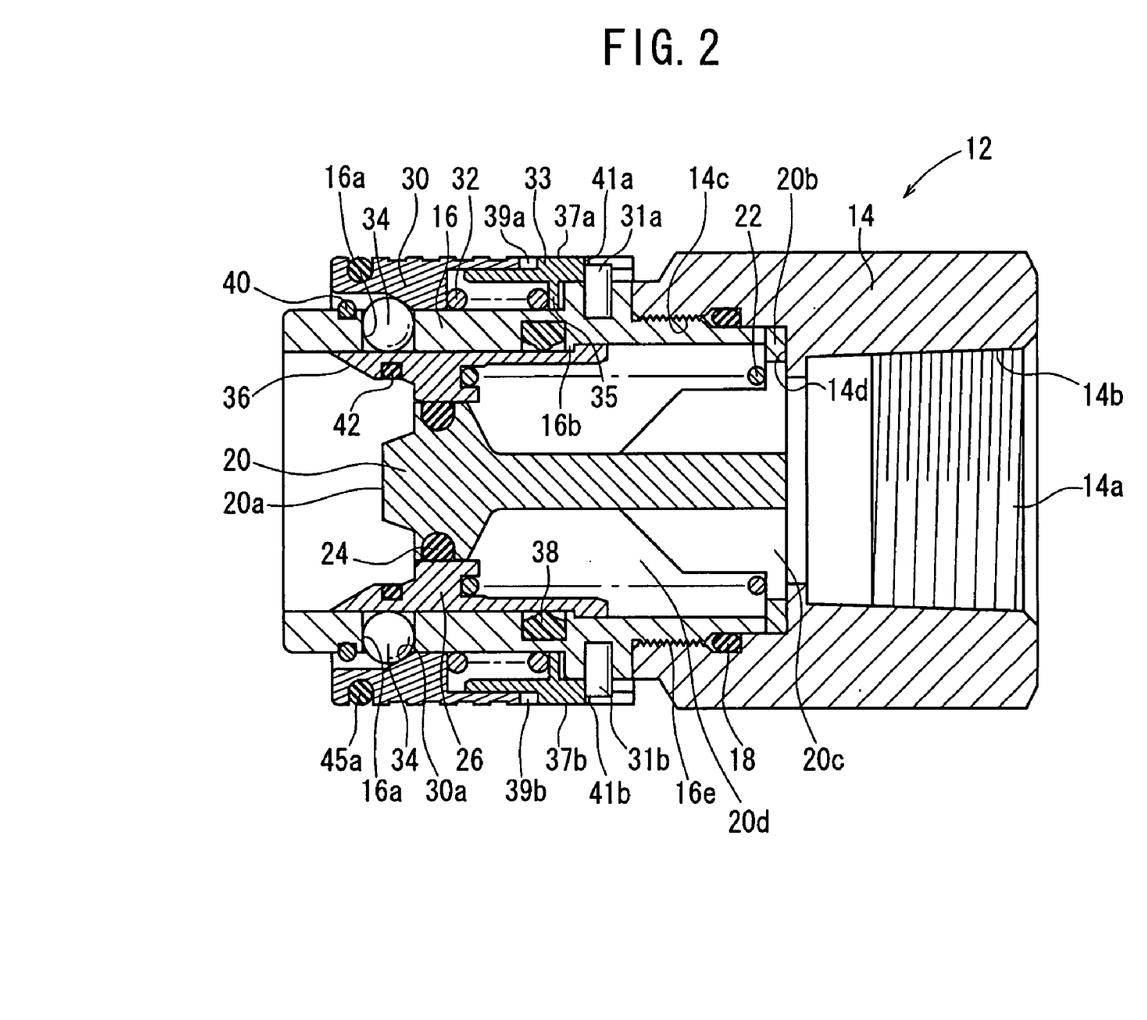
FIG. 2 shows a longitudinal sectional view illustrating a socket.

At first, an explanation will be made with reference to FIG. 2 about the socket 12 in the separated state.

In this description, the separated or disengaged state refers to the state in which the socket 12 and the plug 112 are separated from each other. On the other hand, the connected or coupled state refers to the state in which the respective fluid passages of the socket 12 and the plug 112 are communicated with each other. The state other than the separated state and the connected state is referred to as the intermediate state.

The socket 12 includes a back body 14 which has a screw groove 14c on the inner circumferential surface at the front end and which has a stepped section 14d in the radial direction disposed at an intermediate portion, a socket body 16 which is screw-engaged with the screw groove 14c of the back body 14 to integrally form a cylindrical shape, a socket valve 20 which is coaxially arranged at the axial center of the socket 12, and a plurality of steel balls 34 which are inserted into a plurality of holes 16a having diameters reduced in the inner diametral direction in the vicinity of the front end of the socket body 16.

The socket 12 further includes, for example, a thin cylindrical sleeve 30 which is provided outside the socket body 16 and which is fastened by the steel balls 34 while being urged frontwardly by a coil spring 32, a collar 26 which is formed to have a shape with substantially no gap between the inner circumferential surface of the socket body 16 and a columnar portion disposed at the front end of the socket valve 20, and an O-ring 42 which is inserted into a groove formed in the vicinity of an inclined surface 36 on the side of the front end of the collar 26.

A pair of pins 31a, 31b, which slightly protrude radially outwardly and which have an angle of separation of 180 degrees, are secured to the outer circumferential surface of the socket body 16. As shown in FIGS. 1 and 2, a ring-shaped ratchet 33 is arranged rotatably in the circumferential direction at the outside of the socket body 16. The ratchet 33 is urged in a direction to make separation from the sleeve 30 by means of the spring force of a coil spring 32. The ratchet 33 is provided displaceably toward the sleeve 30 while overcoming the spring force of the coil spring 32.

The ratchet 33 is provided with an annular projection 35 which protrudes by a predetermined length radially inwardly and to which an end of the coil spring 32 is fastened, and a pair of projections 37a, 37b which have substantially semielliptic cross sections and which have an angle of separation of 180 degrees in the circumferential direction respectively. In this arrangement, the pair of projections 37a, 37b, which are formed for the ratchet 33, are engaged with a pair of cutouts 39a, 39b which are formed at rear end portions of the sleeve 30 respectively. Accordingly, the sleeve 30 and the ratchet 33 are synchronously rotated in an integrated manner (see FIGS. 6 and 7).

In this embodiment, the cutouts 39a, 39b are formed for the sleeve 30, and the projections 37a, 37b are formed on the ratchet 33. However, there is no limitation thereto. The following structure may be available. That is, the projections 37a, 37b may be formed on the sleeve 30, and the cutouts 39a, 39b may be formed for the ratchet 33 to integrally rotate the sleeve 30 and the ratchet 33 respectively.

A pair of first engaging recesses 41a, 41b, which make engagement with the pair of pins 31a, 31b respectively, are formed at the rear ends of the projections 37a, 37b. A pair of second engaging recesses 43a, 43b, which are arranged with an angle of separation of 90 degrees and which make engagement with the pins 31a, 31b, are formed between the pair of projections 37a, 37b (see FIG. 4).

When the sleeve 30 and the ratchet 33 are rotated in an integrated manner, any one of the pair of first engaging recesses 41a, 41b and the second engaging recesses 43a, 43b makes abutment against the pair of pins 31a, 31b secured to the socket body 16. Accordingly, the abutment sound of "click" is obtained to successfully give the click feeling to the operator.

When the sleeve 30 and the ratchet 33 are integrally rotated in the circumferential direction, and the pins 31a, 31b abut against the first engaging recesses 41a, 41b formed at the rear ends of the projections 37a, 37b of the ratchet 33, then the pins 31a, 31b are coincident in the axial direction with the cutouts 39a, 39b formed for the sleeve 30. Therefore, the sleeve 30 is displaceable in the axial direction, giving the unlocked state in which the socket 12 and the plug 112 can be separated from each other (see FIGS. 6 and 1).

On the other hand, when the sleeve 30 and the ratchet 33 are integrally rotated in the circumferential direction, and the pins 31a, 31b abut against the second engaging recesses 43a, 43b formed for the ratchet 33, then the pins 31a, 31b are not coincident in the axial direction with the cutouts 39a, 39b formed for the sleeve 30. Therefore, if it is intended that the sleeve 30 is displaced in the axial direction, the rear end surface thereof abuts against the pins 31a, 31b to restrict the displacement, giving the locked state in which the socket 12 and the plug 112 are prevented from being separated from each other (see FIGS. 7 and 8).

The back body 14 has, at the rear end, an opening 14a which is connectable to a joint for constructing another tube passage. A screw groove 14b is formed on the inner circumferential surface of the opening 14a. Even when there are many types of tube passages to be connected, it is enough for the socket 12 that only the back body 14 is exchanged with another one having a shape which is adapted to the tube passage to be connected.

The socket body 16 has a screw section (first connecting section) 16e which is formed on the outer circumferential surface in the vicinity of the rear end, and it is screw-engageable with the screw groove 14c formed on the inner circumferential surface of the back body 14 to integrally form the outer circumferential portion of the socket 12. An annular recess is formed on the inner circumferential surface of the back body 14 to which the socket body 16 is connected. An O-ring 18, which prevents the fluid from any leakage, is installed to the annular recess.

An annular groove is formed on the inner circumferential surface at an intermediate portion of the socket body 16. A packing 38, which makes engagement with the outer circumferential surface of the collar 26 to form the water-tight structure (or the gas-tight structure), is arranged in the annular groove.

A plurality of holes 16a, which are separated from each other by predetermined angles in the circumferential direction, are formed between the packing 38 and the front end of the socket body 16. The steel balls (balls) 34 are inserted into the respective holes 16a. The steel balls 34 are supported on the inner diametral side by the outer circumferential surface of the collar 26, and parts of the steel balls 34 protrude to the outside of the socket body 16. The protruding portions abut against a stepped section 30a having an inclination on the inner circumferential surface disposed in the vicinity of the front end of the sleeve 30 to serve as a stopper for the sleeve 30.

An annular groove is formed at a portion disposed frontwardly as compared with the hole 16a on the outer circumferential surface of the socket body 16. A stopper ring 40, which functions as a disengagement stopper for the sleeve 30 when the plug 112 is coupled or connected, is installed to the annular groove.

The socket valve 20 has an circular annular projection 20b (see FIG. 3) which is disposed at the rear end and which makes abutment against the stepped section 14d of the back body 14.

Figure 3:
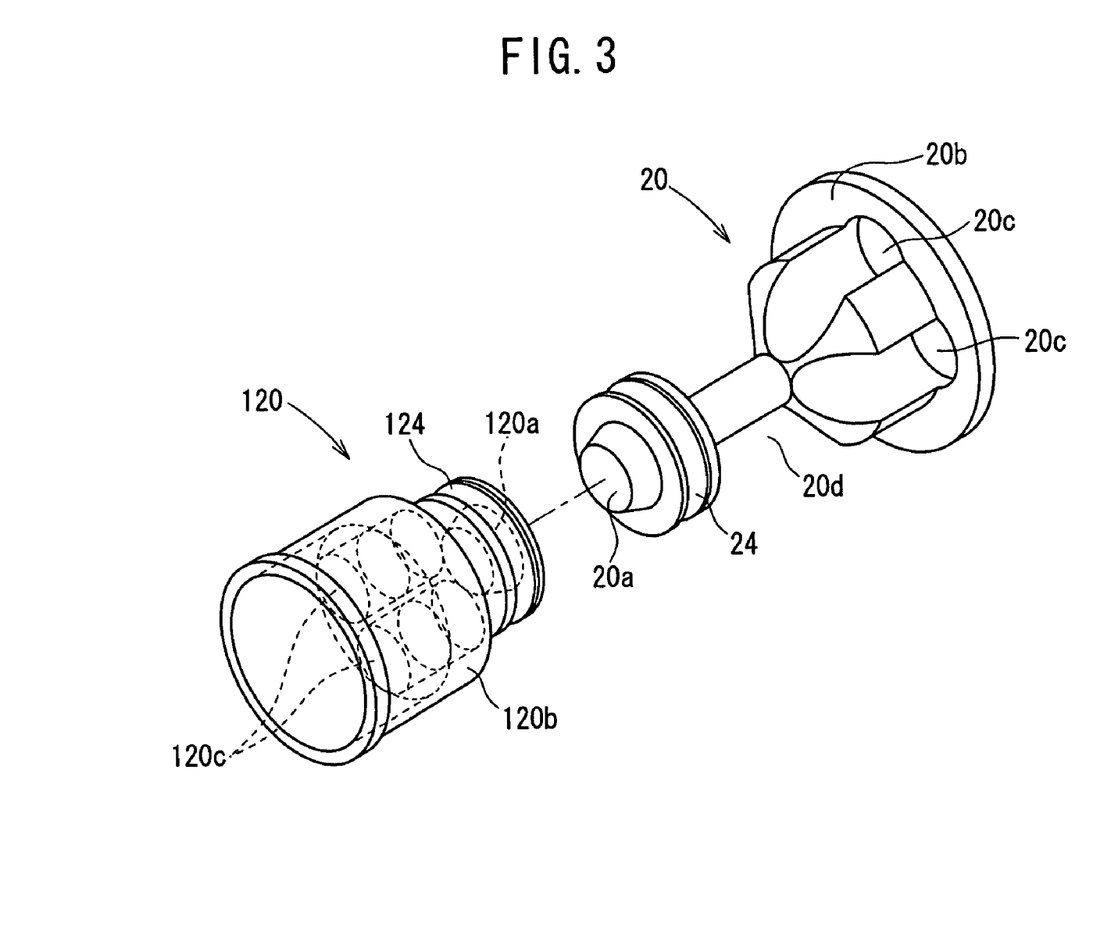
FIG. 3 shows a perspective view illustrating a socket valve and a plug valve.
Figure 4:
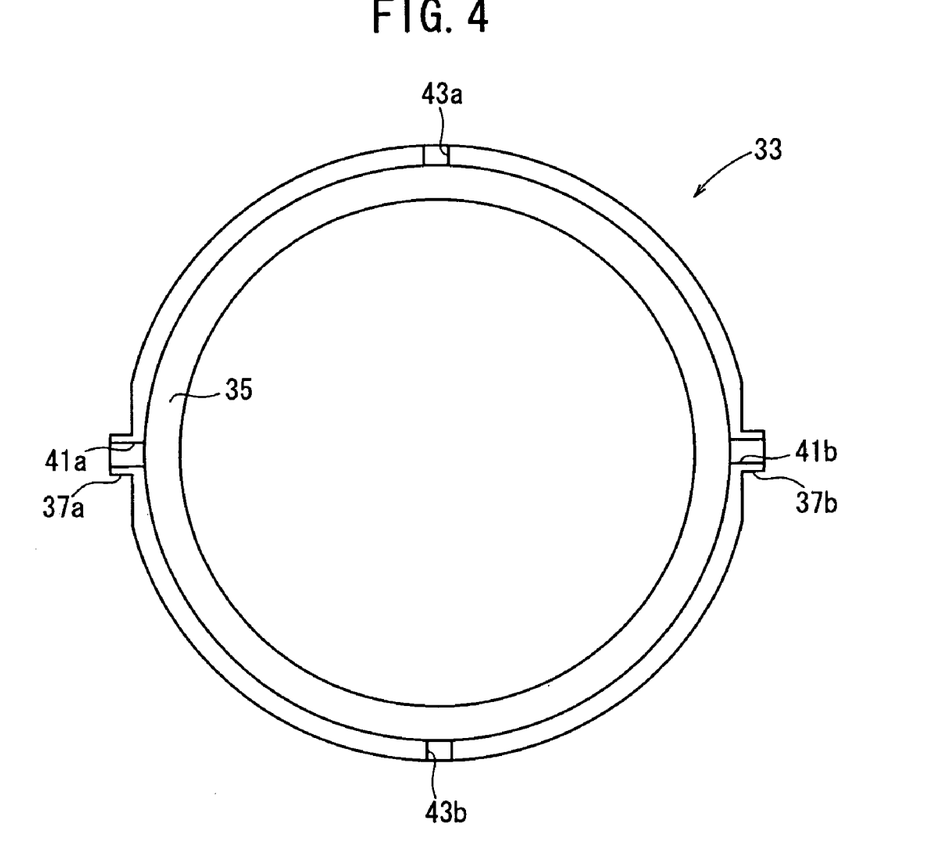
FIG. 4 shows a side view illustrating a ratchet.

As shown in FIG. 3, an annular and relatively large depression 20d is provided at a substantially central portion in the axial direction. A plurality of through-holes 20c are provided as flow passages disposed rearwardly from the depression 20d. An O-ring 24 is installed to an annular groove which is formed on the outer circumference of a columnar portion disposed in the vicinity of the front end. The O-ring 24 is pressed (interposed) by the inner circumferential surface of the collar 26 to avoid any leakage of the fluid.

A substantially truncated cone-shaped projection 20a is formed at the front end of the socket valve 20 to adjust the position upon the connection to the plug 112.

The collar 26 has its outer circumferential surface and inner circumferential surface which are formed to have cylindrical shapes concentric, for example, with respect to the socket body 16. The collar 26 is interposed between the inner circumferential surface of the socket body 16 and the outer circumferential surface of the columnar portion disposed on the side of the front end of the socket valve 20.

An inclined surface 36, which is diametrally reduced gradually toward the center, is formed at the front end of the collar 26 with a groove which is provided on the inner circumferential surface at an intermediate portion. One end of the coil spring 22 is inserted into the groove. The other end of the coil spring 22 abuts against the annular projection 20b of the socket valve 20. The collar 26 is urged frontwardly by means of the spring force. The collar 26 is fastened by the projection 16b disposed on the inner circumferential surface of the socket body 16.

Figure 5:
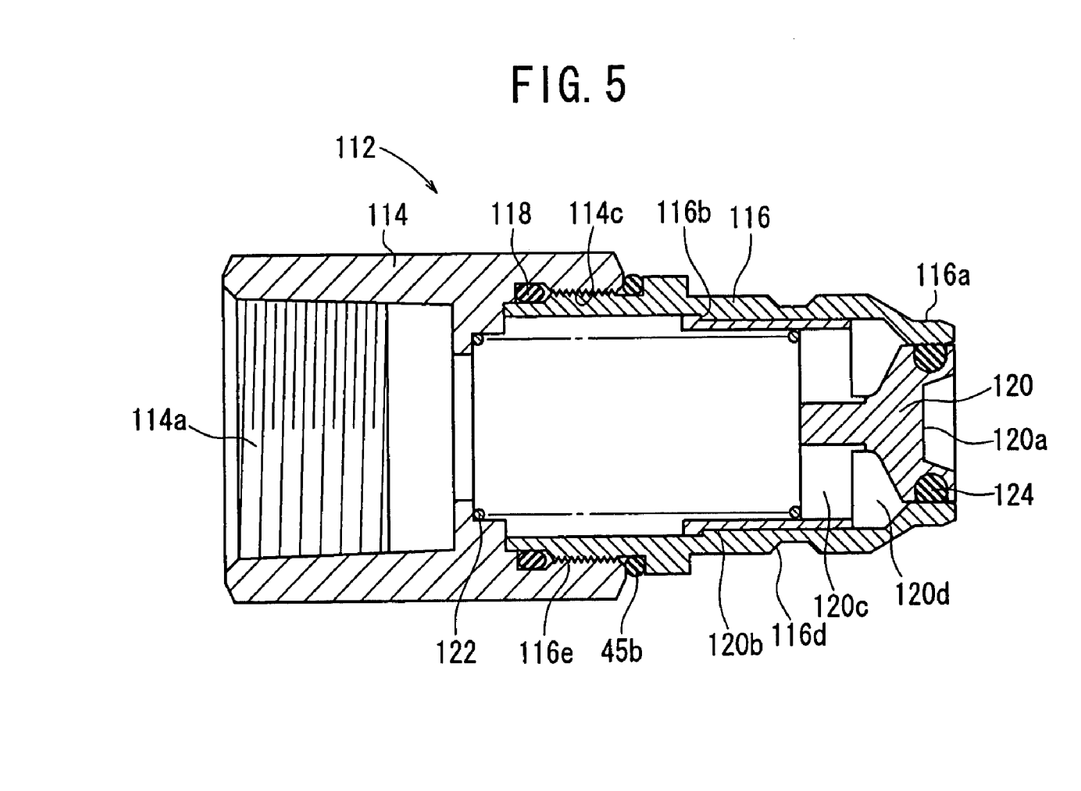
FIG. 5 shows a longitudinal sectional view illustrating a plug.
Figure 6:
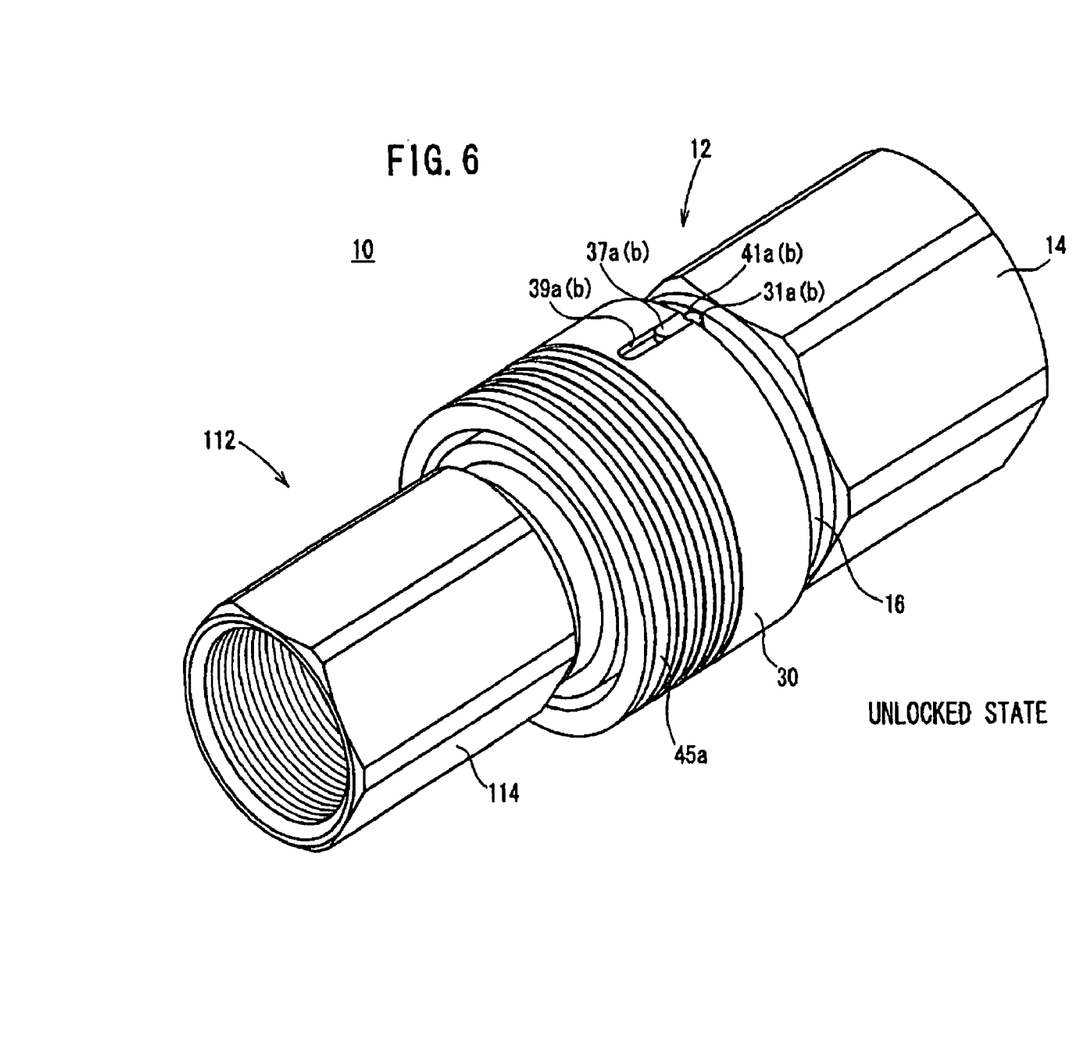
FIG. 6 shows a perspective view illustrating the unlocked state of the tube joint.
Figure 7:
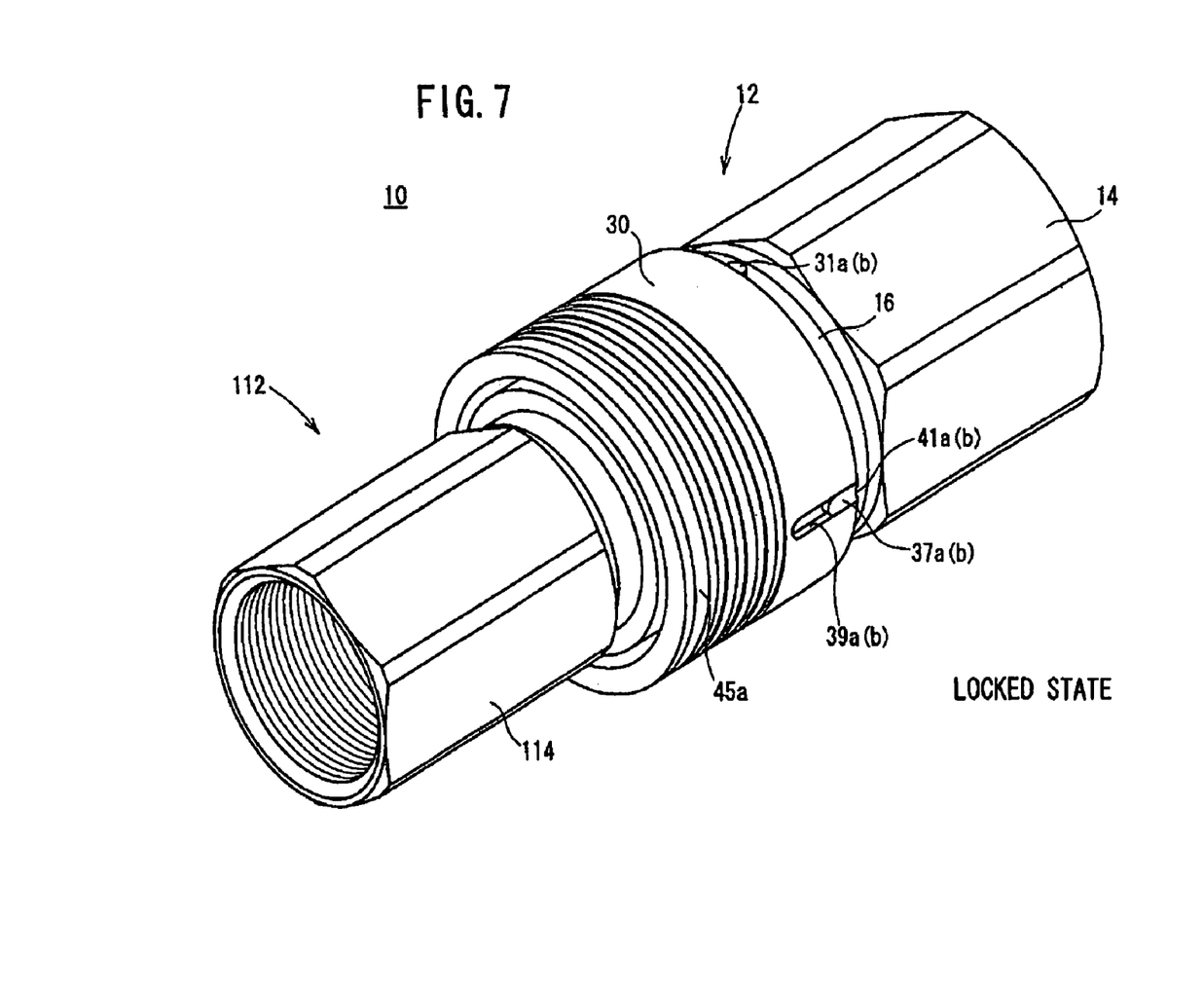
FIG. 7 shows a perspective view illustrating the locked state of the tube joint.
Figure 8:
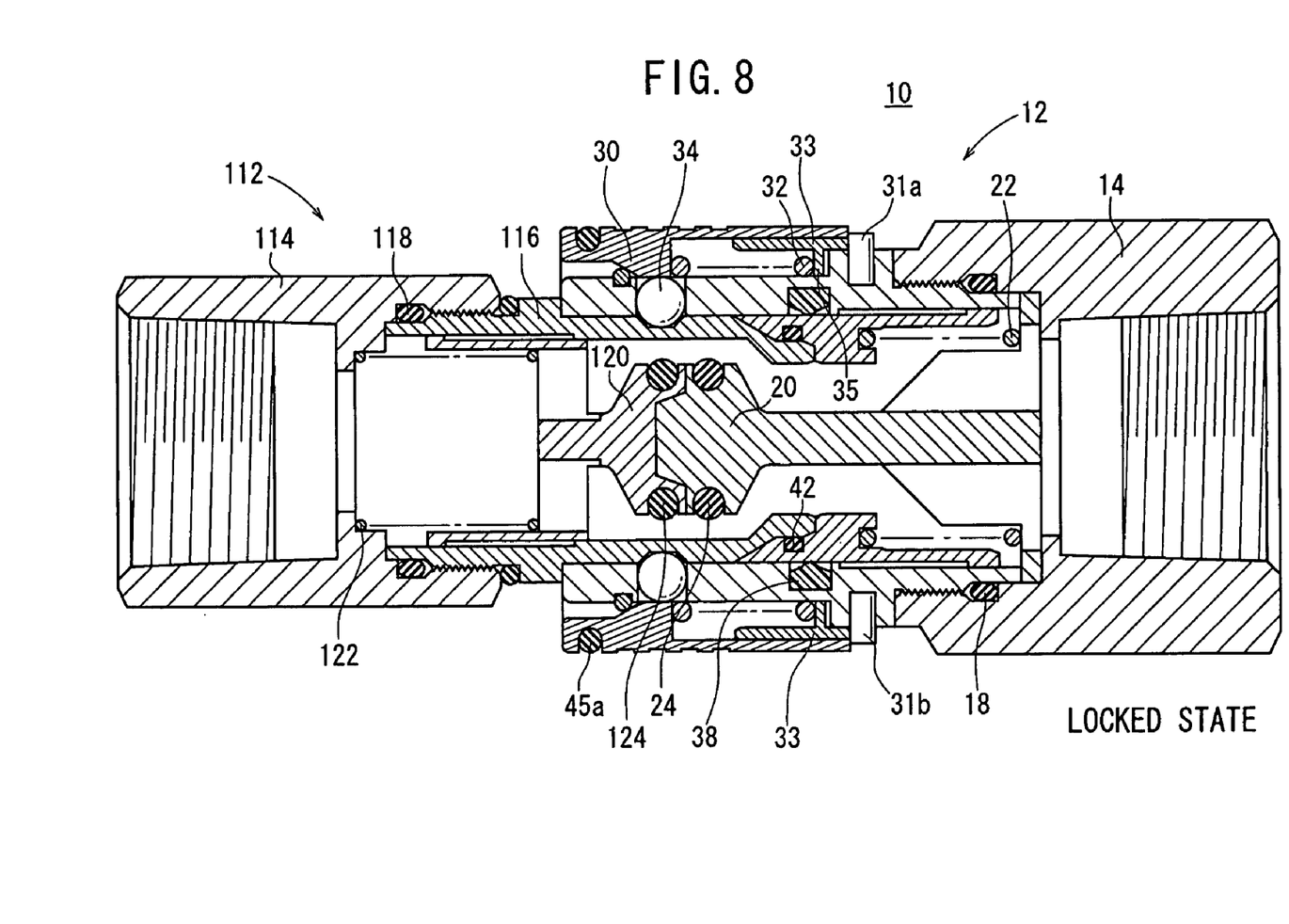
FIG. 8 shows a longitudinal sectional view taken in the axial direction illustrating the tube joint shown in FIG. 7.

Next, an explanation will be made with reference to FIG. 5 about the separated state of the plug 112.

The plug 112 comprises, for example, a back body 114 which is thin-walled and which has a small outer diameter as compared with the back body 14, a plug body 116 which is screw-engaged with a screw groove 114c formed on the inner circumferential surface on the front end side of the back body 114 and which integrally forms a cylindrical shape therewith, and a plug valve 120 which is arranged coaxially at an axially central portion of the plug 112 and which has the outer circumferential surface formed to have substantially no gap with respect to the inner circumferential surface of the plug body 116.

The plug body 116 has a screw section 116e which is formed on the outer circumferential surface in the vicinity of the rear end and which is screw-engaged with the screw groove 114c of the back body 114 to construct the outer circumferential portion of the plug 112 in an integrated manner. An annular groove 116d, which has a trapezoidal cross section and which has a widely open outer diametral side, is formed on the outer circumferential surface of the plug body 116.

The front end of the plug body 116 is formed to be slightly diametrally reduced as compared with other portions. A seal surface 116a, which is composed of a substantially columnar surface, is formed at the front end. The seal function is exhibited by the contact between the seal surface 116a which is formed at the front end of the plug body 116 and the O-ring 42 which is installed in the vicinity of the inclined surface 36 of the collar 26.

An annular gap is formed on the inner circumferential surface of the connecting portion between the plug body 116 and the back body 114. An O-ring 118, which avoids any leakage of the fluid, is installed to the annular gap.

The plug valve 120 has a large outer diameter section 120b (see FIG. 3) and a columnar portion disposed at the front end, and an annular and relatively large depression 120d (see FIG. 5) is provided therebetween. A plurality of through-holes 120c are formed as flow passages at positions rearwardly from the depression 120d.

An O-ring 124 is provided in an annular groove which is formed on the outer circumference in the vicinity of the front end. The O-ring 124 is pressed by the inner circumferential surface of the front end of the plug body 116 to form the water-tight structure (or the gas-tight structure).

The outer diameter of the front end surface of the plug valve 120 is set to be the same as that of the front end surface of the socket valve 20. A truncated cone-shaped recess 120a is formed to have such a shape that the recess 120a is fitted to the projection 20a with substantially no gap to adjust the position when the connection is made to the plug 112.

A coil spring 122 is interposed between the back body 114 and the plug valve 120. One end of the coil spring 122 abuts against the inner surface of the large outer diameter section 120b of the plug valve 120, and the other end of the coil spring 122 abuts against the annular stepped section of the back body 114. The plug valve 120 is urged frontwardly by means of the spring force thereof. The plug valve 120 is fastened by the projection 116b on the inner circumferential surface of the plug body 116.

A first identification ring 45a and a second identification ring 45b, which are usable to manage the connection between the socket 12 and the plug 112, are installed to the sleeve 30 for constructing the outer surface of the socket 12 and the plug body 116 for constructing the outer surface of the plug 112 respectively.

The first identification ring 45a is composed of, for example, an O-ring which is installed to an annular groove formed on the outer circumferential surface in the vicinity of the front end of the sleeve 30. The second identification ring 45b is composed of, for example, an O-ring which is installed to an annular groove formed on the outer circumferential surface of the plug body 116 in the vicinity of the front end of the back body 114.

The first identification ring 45a and the second identification ring 45b are colored with an identical color respectively to identify a line to which a plurality of pipings are connected so that the socket 12 having the first identification ring 45a is mutually connected to the plug 112 having the second identification ring 45b which has the same color as that of the first identification ring 45a. Accordingly, it is possible to avoid any erroneous line connection. As a result, the line can be conveniently identified or distinguished by means of the color, and it is possible to manage the piping with ease.

Next, an explanation will be made with reference to FIGS. 1 and 9 about the operation for connecting and separating the socket 12 and the plug 112. It is assumed that unillustrated fully flexible hose tube passages, for example, are connected to the openings 14a, 114a of the socket 12 and the plug 112, and the interiors of the socket 12 and the plug 112 are previously filled with the fluid (liquid or gas).

Figure 9:
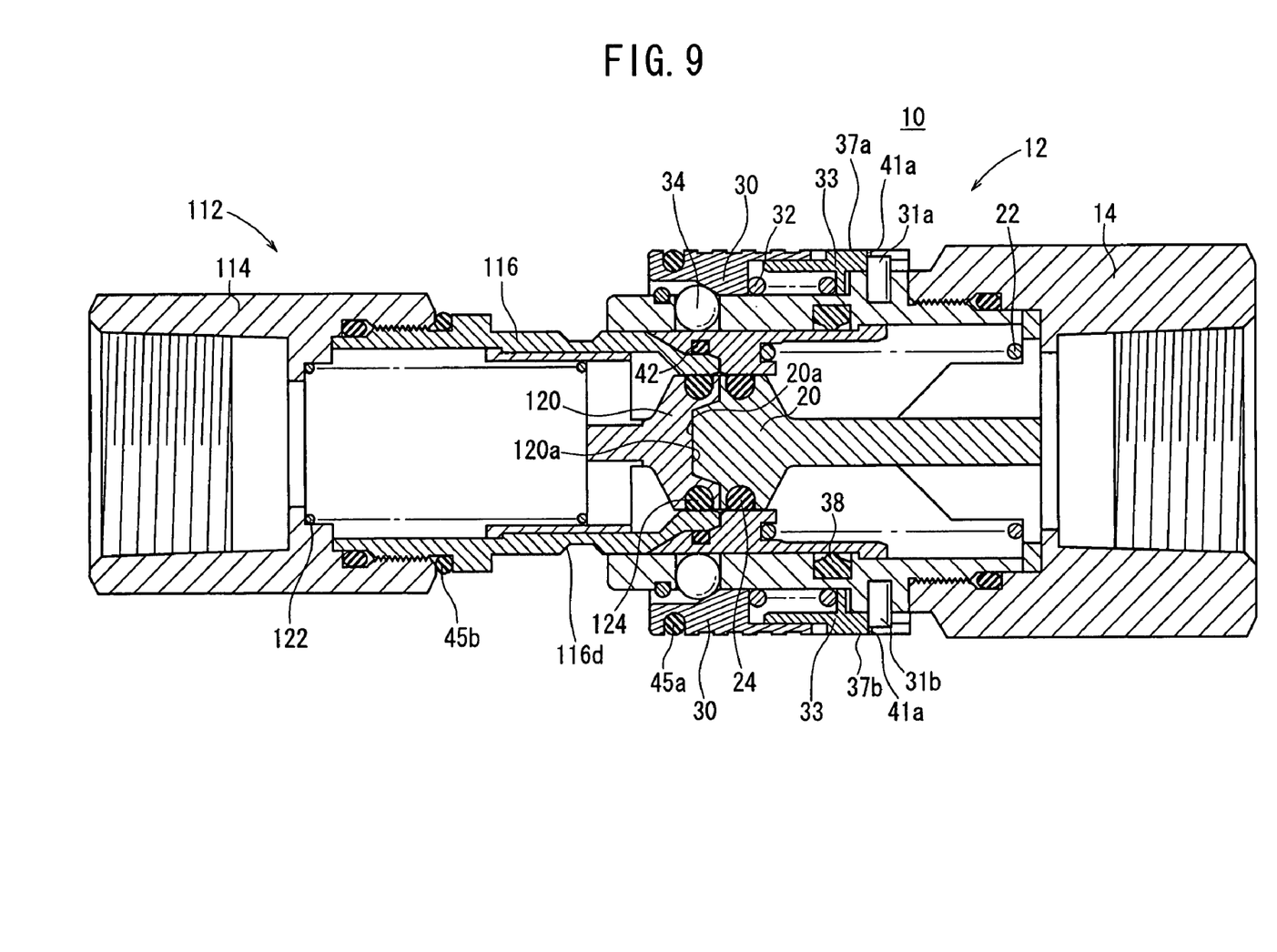
FIG. 9 shows a longitudinal sectional view illustrating the initial state for connecting the socket and the plug.

At first, as shown in FIG. 9, the respective front end surfaces of the socket 12 and the plug 112 are subjected to the abutment. In this situation, the projection 20a disposed at the front end surface of the socket valve 20 is fitted to the recess 120a disposed at the front end surface of the plug valve 120, and thus the positioning is reliably effected.

The seal surface 116a, which is formed at the front end of the plug body 116, presses and compresses the O-ring 42 which is provided in the vicinity of the inclined surface of the collar 26. Accordingly, the front end of the plug body 116 abuts against the front end of the collar 26.

Subsequently, the plug 112 is inserted into the socket 12. In a state in which the front end of the plug body 116 is inserted to arrive at a portion in the vicinity of the steel balls 34 of the socket 12, the collar 26 compresses the coil spring 22 to move relatively rearwardly with respect to the socket 12. The plug valve 120 compresses the coil spring 122 to move relatively rearwardly with respect to the plug 112.

In this situation, the O-ring 24 which has formed the water-tight structure (or the gas-tight structure) in front of the socket 12, and the O-ring 124 which has formed the water-tight structure (or the gas-tight structure) in front of the plug 112 are separated from the inner circumferential surface of the collar 26 and the inner circumferential surface of the plug body 116 respectively. Accordingly, the seal structures are released to start the communication between the flow passages of the socket 12 and the plug 112. At this point of time, the O-ring 42 constitutes the seal structure with respect to the outside.

In other words, the water-tight state (or the gas-tight state) is retained by the O-rings 18, 42, 118 and the packing 38 for the fluid contained in the tube passage.

When the plug 112 is further inserted, and the plug 112 is completely connected or coupled to the socket 12, then the front end of the plug body 116 is inserted to arrive at substantially the same position as that the packing 38 of the socket 12 as shown in FIG. 1, and the collar 26 and the plug valve 120 compress the coil spring 22 and the coil spring 122 respectively to effect the movement.

The annular groove 116d of the plug body 116 is positioned on the inner diameter side of the steel balls 34. Therefore, the movement can be effected in the inner diametral direction. On the other hand, the steel balls 34 receive the urging force from the inclined stepped section 30a of the sleeve 30 and the coil spring 32. Therefore, the steel balls 34 are moved in the inner diametral direction by the aid of the inclined surface of the stepped section 30a to enter the inside from the outer circumferential surface of the socket body 16.

When the steel balls 34 enter the inside from the socket body 16, then the sleeve 30 is moved frontwardly, and it is fastened by the stopper ring 40 disposed frontwardly therefrom. The inner circumferential surface of the sleeve 30 is positioned to cover the outer circumferences of the steel balls 34, and the steel balls 34 are retained on the inner diametral side.

The steel balls 34 are introduced and retained in the annular groove 116d of the plug body 116, and hence the plug 112 is prevented from the disengagement from the socket 12.

In this state, the opening 14a disposed at the rear end of the socket 12 and the opening 114a disposed at the rear end of the plug 112 form the flow passage to pass through the through-holes 20c and the depression 20d of the socket valve 20 and the depression 120d and the through-holes 120c of the plug valve 120. The flow passage is retained in the water-tight state (or the gas-tight state) by the O-rings 18, 42, 118 and the packing 38.

The front end surface of the socket valve 20 has the same outer diameter as that of the front end surface of the plug valve 120, and the entire surfaces make tight contact with each other. Therefore, the flow passage area and the flow passage direction are constant for the fluid flowing therearound, and the pressure loss of the fluid is scarcely caused.

Next, an explanation will be made about the operation for separating the plug 112 from the socket 12.

When the force is applied to the sleeve 30 to cause the rearward movement, the steel balls 34 are movable in the outer diametral direction. On the other hand, the steel balls 34 receive the urging force from the coil springs 22, 122 and the inclined surface of the annular groove 116d of the plug body 116. Therefore, the steel balls 34 are extruded in the outer diametral direction by the inclined surface of the annular groove 116d, and they protrude to the outside from the inner circumferential surface of the socket body 16.

When the steel balls 34 protrude to the outside from the annular groove 116d, then the collar 26 is moved while extruding the plug body 116 frontwardly, and the socket 12 and the plug 112 are separated from each other. Further, the plug valve 120 also functions to extrude and separate the socket valve 20 while receiving the urging force from the coil spring 122.

In this situation, the front end surface of the socket 12 makes tight contact with the front end surface of the plug 112, and the respective front end surfaces of the socket valve 20 and the plug valve 120 make tight contact with each other until they are separated from each other so that no gap is formed. Therefore, no fluid leaks when the socket 12 and the plug 112 are separated from each other.

For the same or equivalent reason, no outside air is mixed into the fluid when the socket 12 is connected to the plug 112.

When the socket 12 and the plug 112 are separated from each other, then the sleeve 30 is fastened by the steel balls 34 again, and it is positioned at the rearward position.

According to the first embodiment, even when any unexpected external force is exerted on the sleeve 30, the rotational displacement of the sleeve 30 in the circumferential direction is restricted by the spring force of the coil spring 32 interposed between the sleeve 30 and the ratchet 33. Therefore, the locked state of the sleeve 30 can be retained reliably and stably.

In other words, the following arrangement is provided. That is, the coil spring 32 is interposed between the ratchet 33 and the sleeve 30 which is rotatable in an integrated manner under the engaging action of the cutouts 39a, 39b and the projections 37a, 37b. The sleeve 30 and the ratchet 33 are urged by the spring force of the coil spring 32 in the directions to make separation from each other. The pair of pins 31a, 31b, which are secured to the socket body 16, abut against the first engaging recesses 41a, 41b or the second engaging recesses 43a, 43b formed on the ratchet 33. Therefore, the sleeve 30 itself does not make direct contact with the pins 31a, 31b. However, the contact is made with the pins 31a, 31b by the aid of the ratchet 33. Accordingly, the sleeve 30 is prevented from the rotation in the circumferential direction which would be otherwise caused by any unexpected external force. It is possible to stabilize the position of the sleeve 30.

When the sleeve 30 and the ratchet 33 are rotated in an integrated manner, then either the pair of the first engaging recesses 41a, 41b or the second engaging recesses 43a, 43b abut against the pair of pins 31a, 31b secured to the socket body 16, and thus the abutment sound of "click" is given to successfully obtain the click feeling by the operator. Therefore, the operator can reliably recognize the achievement of the locked state in the relative positional relationship (relative angle) between the pins 31a, 31b and the sleeve 30.

Even when the fluid circuit, which is obtained by combining a plurality of the tube joints 10 having the identical structure, is constructed, it is possible to avoid any erroneous line connection by connecting the socket 12 having the first identification ring 45a and the plug 112 having the second identification ring 45b which has the same color as that of the first identification ring 45a respectively. In this situation, it is assumed that the first and second identification rings 45a, 45b, which are colored with any color different from the above, are installed to the tube joint 10 of another line. As a result, any erroneous connection is avoided between the socket 12 and the plug 112, and thus the line is conveniently distinguished to successfully perform the piping management with ease.

Next, a tube joint 300 according to a second embodiment will be explained with reference to FIGS. 10 to 13. The same components or parts as those of the tube joint 10 according to the first embodiment are designated by the same reference numerals, any detailed explanation of which will be omitted.

Figure 10:
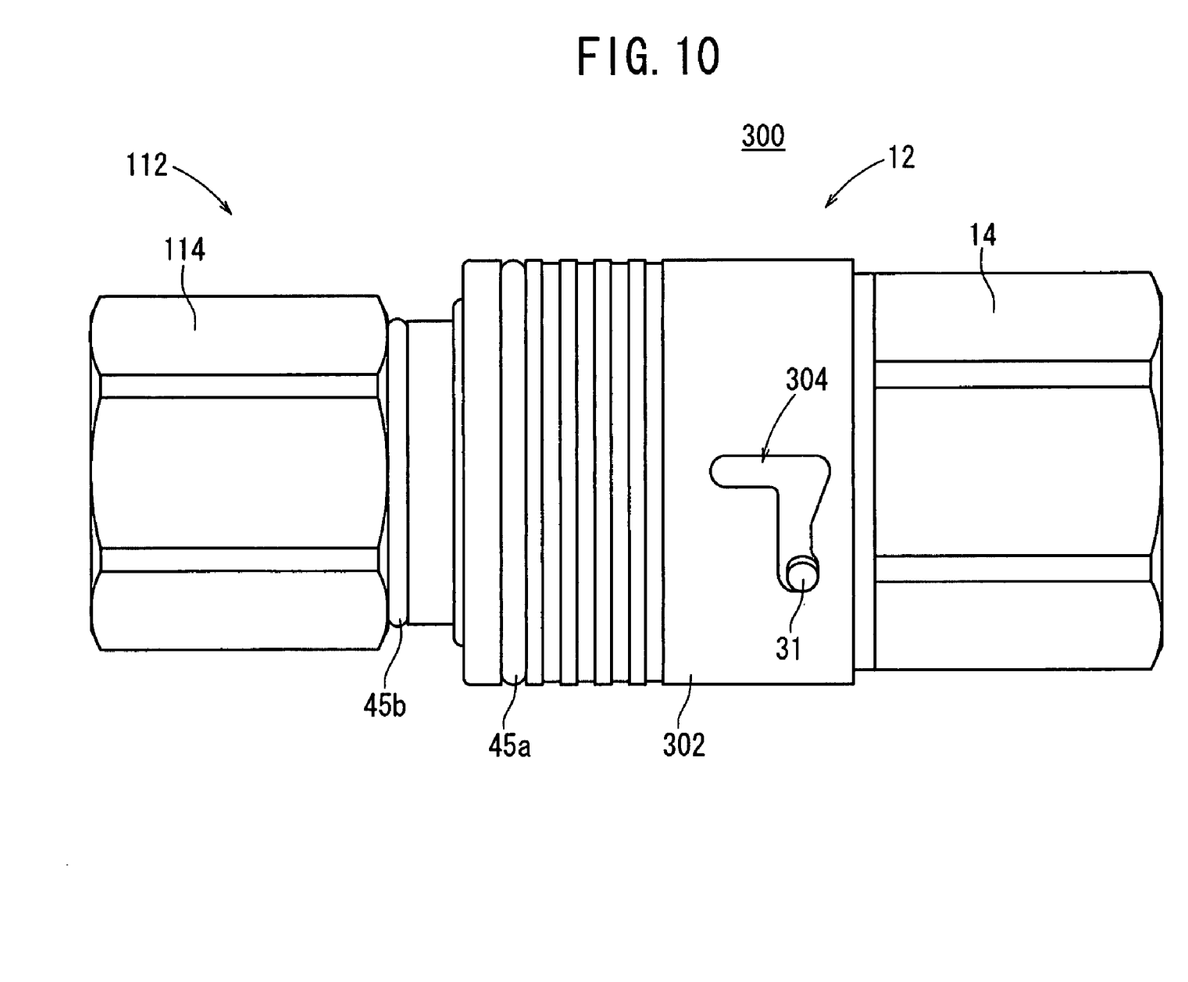
FIG. 10 shows a front view illustrating a tube joint according to a second embodiment.
Figure 11:
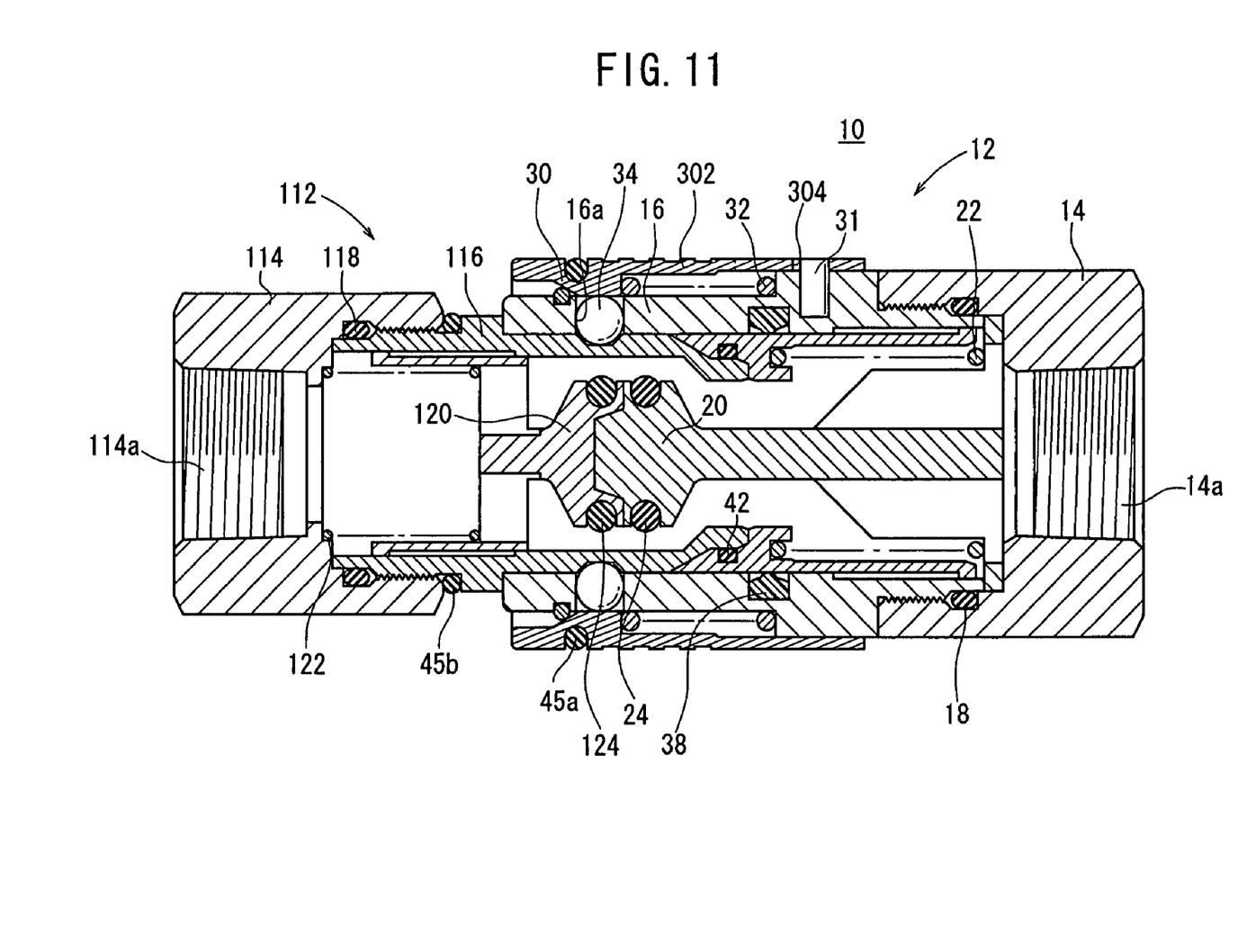
FIG. 11 shows a longitudinal sectional view taken in the axial direction illustrating the tube joint shown in FIG. 10.

The tube joint 300 according to the second embodiment is different from the tube joint 10 according to the first embodiment in that the ratchet 33 is not provided, a single pin 31, which is secured to the socket body 16, is formed, and a groove 304 having a substantially L-shaped cross section, which is engageable with the pin 31, is formed for the sleeve 302.

Figure 12:
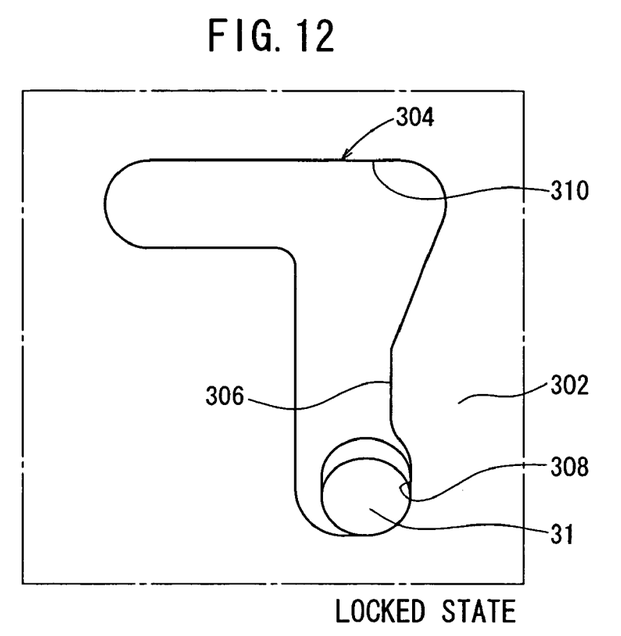
FIG. 12 shows a partial magnified view illustrating the locked state of the tube joint shown in FIG. 10.

That is, the groove 304 having the substantially L-shaped cross section, with which the pin 31 is engaged, is formed for the sleeve 302. As shown in FIG. 12, the pin 31 is fastened to the lower end of the groove 304 by rotating the sleeve 302 in the circumferential direction to give the locked state. During this operation, the pin 31 rides over an inclined surface 306 of the groove 304 to make contact with a curved surface 308. Accordingly, the click sound of "click" is obtained, and the locked state is reliably given.

Figure 13:
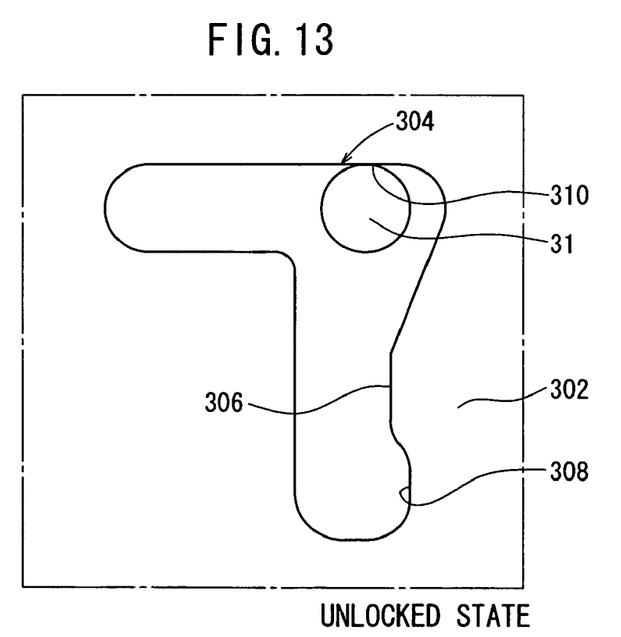
FIG. 13 shows a partial magnified view illustrating the unlocked state of the tube joint shown in FIG. 10.

On the other hand, as shown in FIG. 13, the pin 31 is fastened to an upper end right section 310 of the groove 304 by rotating the sleeve 302 in the circumferential direction opposite to the above, and thus the unlocked state is given.

The arrangement, the function, and the effect other than the above are the same as those described in the first embodiment, any detailed explanation of which is omitted.

What is claimed is:

1. A tube joint comprising a socket and a plug which are detachably connectable by the aid of balls by operating a sleeve, said tube joint further comprising:
    a lock mechanism which prevents said socket and said plug from any disengagement by regulating displacement of said sleeve in an axial direction; and
    a retaining mechanism which retains a locked state by preventing said sleeve from any rotation in a circumferential direction which would be otherwise caused by any unexpected external force,
    wherein said retaining mechanism includes a ratchet which is provided to surround an outer circumferential surface of a socket body and which is rotatable synchronously with said sleeve, and a coil spring which is interposed between said sleeve and said ratchet for urging said sleeve in a direction away from said ratchet under action of a spring force.

2. The tube joint according to claim 1, wherein said ratchet is provided with a pair of projections which have an angle of separation of 180 degrees in said circumferential direction, said sleeve is formed with a pair of cutouts which have an angle of separation of 180 degrees in said circumferential direction, and said ratchet and said sleeve are synchronously rotated by making engagement between said projections and said cutouts.

3. The tube joint according to claim 1, wherein a plurality of pins are secured to said outer circumferential surface of said socket body, and said plurality of pins are provided so that said pins are engageable with a plurality of engaging recesses formed for said ratchet respectively.

4. The tube joint according to claim 3, wherein said plurality of pins are composed of a pair of pins which have an angle of separation of 180 degrees in said circumferential direction.

5. The tube joint according to claim 4, wherein said plurality of engaging recesses comprise a pair of first engaging recesses which have an angle of separation of 180 degrees in said circumferential direction, and a pair of second engaging recesses which are arranged with an angle of separation of 90 degrees between said first engaging recesses.

6. The tube joint according to claim 5, wherein said pins are provided so that said pins are coincident in said axial direction with cutouts formed for said sleeve when said pins abut against said first engaging recesses.

7. The tube joint according to claim 6, wherein said pins are provided so that said pins are not coincident in said axial direction with cutouts formed for said sleeve when said pins abut against said second engaging recesses.

8. The tube joint according to claim 1, wherein a first identification ring is installed to a socket body of said socket, a second identification ring is installed to said plug, and said first identification ring and said second identification ring are colored with an identical color respectively.

9. A tube joint comprising a socket and a plug which are detachably connectable by the aid of balls by operating a sleeve, said tube joint further comprising:
    a lock mechanism which prevents said socket and said plug from any disengagement by regulating displacement of said sleeve in an axial direction; and
    a retaining mechanism which retains a locked state by preventing said sleeve from any rotation in a circumferential direction which would be otherwise caused by any unexpected external force,
    wherein said retaining mechanism includes a single pin which is secured to a socket body, and a groove having a substantially L-shaped cross section which is formed in said sleeve to make engagement with said pin, so that a position of said pin in said groove can be observed and visually confirmed externally of said tube joint.

* * * * *